United States Patent [19]

Testa et al.

[11] Patent Number: 5,263,139
[45] Date of Patent: Nov. 16, 1993

[54] MULTIPLE BUS ARCHITECTURE FOR FLEXIBLE COMMUNICATION AMONG PROCESSOR MODULES AND MEMORY SUBSYSTEMS AND SPECIALIZED SUBSYSTEMS

[75] Inventors: James Testa, Mountain View; Andreas Bechtolsheim, Stanford, both of Calif.

[73] Assignee: Sun Microsystems, Inc., Mountain View, Calif.

[21] Appl. No.: 886,045

[22] Filed: May 19, 1992

[51] Int. Cl.$^5$ .............. G06F 13/14; G06F 13/16; G06F 13/20
[52] U.S. Cl. .............. 395/325; 364/DIG. 1; 364/229; 364/231.5; 364/238.4; 364/239; 364/239.1; 364/240; 364/240.2; 364/240.3; 364/243; 364/243.1; 364/253.1; 364/254.9; 364/260.260.1; 364/270
[58] Field of Search ............... 395/325, 275, 425, 725; 361/42

[56] References Cited

U.S. PATENT DOCUMENTS

| | | | |
|---|---|---|---|
| 4,291,370 | 9/1981 | Charles | 395/325 |
| 4,543,628 | 9/1985 | Pomfret | 395/275 |
| 4,545,068 | 10/1985 | Tabata et al. | 382/41 |
| 4,799,146 | 6/1989 | Chauvel | 395/325 |
| 4,853,846 | 8/1989 | Johnson et al. | 395/325 |
| 4,908,749 | 3/1990 | Marshall et al. | 395/325 |
| 4,933,845 | 6/1990 | Hayes | 395/325 |
| 4,959,774 | 9/1990 | Davis | 395/325 |
| 4,961,140 | 10/1990 | Pechanek et al. | 395/325 |
| 4,982,321 | 1/1991 | Pantry et al. | 395/425 |
| 5,029,074 | 7/1991 | Maskas et al. | 395/325 |
| 5,058,051 | 10/1991 | Brooks | 395/425 |
| 5,097,437 | 5/1992 | Larson | 395/775 |
| 5,126,910 | 6/1992 | Windsor et al. | 361/42 |
| 5,142,682 | 8/1992 | Lemay et al. | 395/325 |
| 5,145,396 | 9/1992 | Yeung | 439/326 |
| 5,151,997 | 9/1992 | Bailey et al. | 395/800 |

Primary Examiner—Michael R. Fleming
Assistant Examiner—Ayaz R. Sheikh
Attorney, Agent, or Firm—Blakely Sokoloff Taylor & Zafman

[57] ABSTRACT

A multiple bus architecture for flexible communication between processors, memory subsystems, and specialized subsystems over multiple high performance communication pathways. The multiple bus architecture enables flexible communication between processors and devices coupled to a multiprocessor bus, a system interconnect bus, an external bus, an input/output bus, and a memory subsystem. Processor modules coupled to multiprocessor bus slots access the memory subsystem over the multiprocessor bus. System interconnect modules coupled to system interconnect bus slots access the memory subsystem via the system interconnect bus, and the multiprocessor bus. Processor modules coupled to multiprocessor bus slots access devices on the external bus via the system interconnect bus.

13 Claims, 3 Drawing Sheets ns and memory subsystems and specialized subsystems

BACKGROUND OF THE INVENTION

1. Field of the Invention

This invention relates to the field of computer system architecture. More particularly, this invention relates to multiple bus architectures in a computer system.

2. Background

A typical computer system is comprised of a processor or CPU, a memory subsystem, an input/output subsystem, and other specialized subsystems. Communication between the processor and the subsystems is usually accomplished through one or more communication pathways known as buses. In many computer systems, the processor and subsystems are coupled for communication over a common bus.

As computer technology progresses, the performance of the processor and other subsystems improves. The improved performance in one subsystem creates the need for improved performance in the other subsystems. For example, as the performance of the processor improves, the memory or input/output subsystem is often redesigned to accommodate the improved processor performance. Similarly, as the performance of the memory subsystem improves, the processor architecture is changed to take advantage of the improved memory subsystem performance.

With the progressive performance improvements in processor, memory subsystem, and specialized subsystems, the communication pathways of the computer system often become the performance "bottlenecks." In past computer systems, the communication pathway architecture was designed in response to improvements to the processor and subsystems. The performance of such systems was not easily improved without redesigning the entire system including the communication pathways.

As will be described, the present multiple bus architecture provides flexible communication between processors, memory subsystems, and specialized subsystems over multiple high performance communication pathways. The high performance communication pathways enable communication for multiple processors and multiple subsystems, and enables flexible upgrade to higher performance processors and subsystems.

SUMMARY OF THE INVENTION

A multiple bus architecture is disclosed that provides flexible communication between processors, memory subsystems, and specialized subsystems over multiple high performance communication pathways. The multiple bus architecture includes connector slots, buses, and circuitry for coupling processor modules, memory modules, and system interconnect modules. The multiple bus architecture enables communication over a multiprocessor bus, a system interconnect bus, a memory bus, a SCSI bus, and an external bus.

A pair of multiprocessor bus slots are provided for coupling the multiprocessor bus to processor modules. A memory controller (EMC) is coupled for communication between the multiprocessor bus and the memory bus. The EMC enables processor modules coupled to the multiprocessor bus slots to access a memory subsystem over the memory bus.

The memory subsystem enables coupling of VRAM Simms (VSIMMs), DRAM Simms (DSIMMs), and SRAM Simms (SSIMMs) to the memory bus. The DSIMMs coupled to the memory bus comprise the main memory for the multiple bus architecture. The VSIMMs coupled to the memory bus enable video frame buffer storage. The video connector provides a video output port for each of the VSIMMs, and enables coupling of the VSIMMs to display monitors. The SSIMMs use a battery power backup for non-volatile memory storage in case of power failure.

The system interconnect bus enables communication with system interconnect modules coupled to a set of system interconnect bus slots. A multiprocessor bus to system interconnect bus interface device (MSI) enables communication between the multiprocessor bus and the system interconnect bus. The MSI translates access requests between the multiprocessor bus and the system interconnect bus.

A system interconnect to external bus interface device (SEC) enables communication between the system interconnect bus and devices coupled to an external bus. A system interconnect to external data interface device (DMA) enables communication between the system interconnect bus and the SCSI bus, and a network communication bus.

The multiple bus architecture enables flexible communication between processors and devices coupled to the multiprocessor bus, the system interconnect bus, the external bus, the SCSI bus, and the memory subsystem. Processor modules coupled to multiprocessor bus slots access the memory subsystem over the multiprocessor bus. System interconnect modules coupled to the system interconnect bus slots access the memory subsystem via the system interconnect bus, through the MSI, and over the multiprocessor bus. Processor modules coupled to the multiprocessor bus slots access the devices on the external bus via the MSI, the system interconnect bus, and the SEC.

DETAILED DESCRIPTION OF THE INVENTION

A multiple bus architecture is disclosed for enabling flexible communication between processors, memory subsystems, and specialized subsystems over multiple high performance communication pathways. In the following description, for purposes of explanation, specific circuit devices, circuit architectures and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
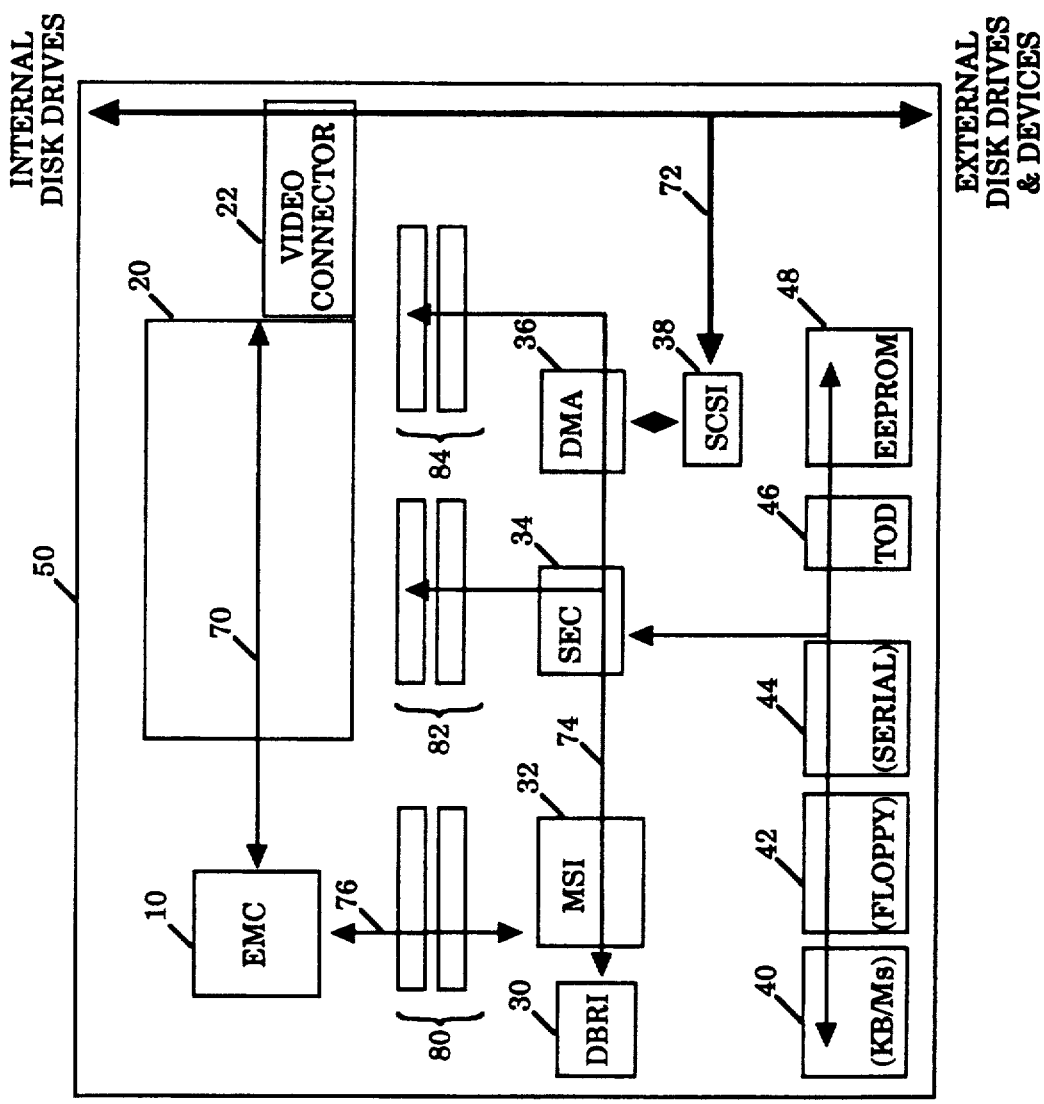
FIG. 1 illustrates the multiple bus architecture employing the teachings of the present invention, and shows a motherboard that provides connector slots, buses, and circuitry for coupling processor modules, memory modules, and system interconnect modules.

Referring now to FIG. 1, the multiple bus architecture implemented on a motherboard 50 employing the teachings of the present invention is illustrated. The motherboard 50 provides connector slots, buses, and circuitry to establish communication pathways for processor modules, memory modules, and system interconnect modules. In the current embodiment, the motherboard 50 enables communication over a multiprocessor bus 76, a system interconnect bus 74, a memory bus 70, a SCSI bus 72, and an external bus 78.

The multiprocessor bus 76 comprises 64 multiplexed address and data lines. The multiprocessor 76 also implements control signal lines for coordinating master and slave transactions, and multiprocessor cache coherency operations. In addition, the multiprocessor bus 76 implements signal lines for indicating status of bus transactions. The multiprocessor bus 76 enables data transfer sizes from one byte up to 128 byte burst transfers. The multiprocessor bus 76 runs at a frequency of 40 MHz.

For further discussion of a multiprocessor bus consistent with the teachings of the present invention, refer to application Ser. No. 07/461,165, filed on Jan. 5, 1990, entitled High Speed Active Bus, and incorporated fully herein by reference.

The motherboard 50 contains a pair of multiprocessor bus slots 80 for coupling to processor modules (not shown). The multiprocessor bus slots 80 couple the processor modules to the multiprocessor bus 76. The motherboard 50 contains a memory controller (EMC) 10, which is coupled to the multiprocessor bus 76, and the memory bus 70. The EMC 10 enables processor modules coupled to the multiprocessor bus slots 80 to access a memory subsystem 20 over the memory bus 70. The EMC 10 receives addresses and data over the multiprocessor bus 76, and generates the RAS, CAS, and controls signals over the memory bus 70 to access the memory subsystem 20.

In the current embodiment, the memory bus 70 comprises 128 data lines in addition to the address and control lines. The memory bus 70 runs at a maximum data transfer rate frequency of 20 MHz. The memory bus 70 has twice the data width of the multiprocessor bus 76 because the memory bus 70 runs at half the frequency of the multiprocessor bus 76. The memory bus 70 delivers 128 bits of data at 20 MHz, which enables the EMC 10 to deliver 64 bits of data at 40 MHz.

For further discussion of a memory bus consistent with the teachings of the present invention, refer to related application Ser. No. 7/886,671, filed on May 19, 1992, entitled A Bus Architecture for Integrated Data and Video Memory, and incorporated fully herein by reference.

The memory subsystem 20 enables coupling of memory Simms, including VRAM Simms (VSIMMs), DRAM Simms (DSIMMs), and SRAM Simms (SSIMMs) to the memory bus 70. The DSIMMs coupled to the memory bus 70 comprise the main memory for the motherboard 50. The VSIMMs coupled to the memory bus 70 enable video frame buffer storage. A video connector 22 provides a video output port for each of the VSIMMs. The video connector 22 enables coupling of the VSIMMs to external display monitors. The SSIMMs provide non-volatile data storage.

In the current embodiment, the memory bus 70 and memory subsystem 20 enables coupling of up to 8 memory Simms. Each of the memory Simms can contain up to 256 Mbytes. The memory subsystem 20 enables coupling of up to 4 VSIMMs, thereby providing support for up to 4 display monitors.

SSIMMs are particularly useful for storing disk file information maintained in main memory, since the SSIMMs provide battery backup for retaining stored information during a system crash or power failure. A computer operating system can maintain the disk file information in a main memory portion of the memory subsystem 20 comprised of SSIMMs. After a system crash, the rebooted operating system can access the disk file information that was not stored on the disk device before the crash. Thus, SSIMMs enable an operating system to maintain the integrity of open disk files despite a system crash or power failure.

The system interconnect bus 74 is comprised of 32 data lines and 28 address lines. The system interconnect bus includes point to point bus request and bus grant signal lines for coordinating bus control for the bus master. The system interconnect bus 74 also includes signal lines for indicating the data size of a bus transaction. The data size for a bus transaction is from one byte up to 64 bytes. In the current embodiment, the system interconnect bus 74 runs at a frequency of 20 MHz.

For further discussion of a system interconnect bus consistent with the teachings of the present invention, refer to application Ser. No. 07/313,250, filed on Feb. 21, 1989, entitled High Speed Bus With Virtual Memory Data Transfer Capability Using Virtual Address/Data Lines, and incorporated fully herein by reference.

The system interconnect bus 74 enables communication between devices on the motherboard 50 and system interconnect modules coupled to a set of system interconnect bus slots 82 and 84. In the current embodiment, the system interconnect bus slots 82 and 84 enable coupling of four system interconnect modules to the motherboard 50.

A multiprocessor bus to system interconnect bus interface device (MSI) 32 enables communication between the multiprocessor bus 76 and the system interconnect bus 74. The MSI 32 translates access requests between the multiprocessor bus 76 and the system interconnect bus 74. The MSI 32 is the main arbiter for the multiprocessor bus 76. The MSI 32 receives all multiprocessor bus requests, and generates all multiprocessor bus grants. The MSI 32 is also the arbiter for the system interconnect bus 74. The MSI 32 receives all system interconnect bus requests, and generates all system interconnect bus grants.

For both the multiprocessor bus 76 and the system interconnect bus 74, the MSI 32 receives bus requests from bus masters requiring exclusive use of the particular bus. The MSI 32 determines whether the requesting bus master has the appropriate priority according to a "round robin" arbitration mechanism. The MSI 32 signals the bus master by asserting the bus grant signal. Thereafter, the bus master begins the data transfer.

A dual basic rate ISDN device (DBRI) 30 enables coupling of ISDN terminal equipment and network terminator interface to the system interconnect bus 74. The DBRI 30 enables worldwide communication over the ISDN digital telephone network via the system interconnect bus 74.

A system interconnect to external bus interface device (SEC) 34 enables communication between the system interconnect bus 74 and devices coupled to an external bus 78. In the current embodiment, the external bus 78 comprises 8 data lines and 16 address lines. The external bus 78 is coupled to a keyboard/mouse (KB/Ms) port 40, an auxiliary serial (Serial) port 44, a floppy disk controller 42, a time of day NV RAM (TOD) 46, and a 4 Mbit EEPROM 48.

A system interconnect to external data interface device (DMA) 36 enables communication between the system interconnect bus 74 and the SCSI bus 72, Thickwire AUI Ethernet and Twisted Pair Ethernet, and a parallel port. The DMA 36 couples to an SCSI interface 38 vial a data and control bus. The SCSI interface 38 is coupled to the SCSI bus 72.

The multiple bus architecture of the motherboard 50 enables flexible communication between processors and devices coupled to the multiprocessor bus 76, the system interconnect bus 74, the external bus 78, the SCSI bus 72, and the memory subsystem 20. Processor modules coupled to multiprocessor bus slots 80 access the memory subsystem 20 over the multiprocessor bus 76. The EMC 10 receives addresses and data from the processor modules over the multiprocessor bus 76 and, accordingly accesses the memory subsystem 20 over the memory bus 70.

System interconnect modules coupled to the system interconnect bus slots 82 and 84 access the memory subsystem 20 via the system interconnect bus 74, through the MSI 32, and over the multiprocessor bus 76 to the EMC 10. Similarly, other bus masters on the system interconnect bus 74, such as the DMA 36, communicate with the memory subsystem 20 via the MSI 32 and the multiprocessor bus 76.

For example, to transfer data to the memory subsystem 20, the DMA 36 transfers the data over the system interconnect bus 74. The data from the DMA 36 is received by the MSI 32, and then transferred over the multiprocessor bus 76 to the EMC 10. The EMC 10 then transfers the data to the memory subsystem 20 over the memory bus 70. In the current embodiment, the DMA 36 accumulates 32 bytes of data for transfer over the system interconnect bus destined for the memory subsystem 20. Since the DMA 36 transfers 32 bytes at a time, and since the multiprocessor bus 76 is faster than the system interconnect bus 74, the multiprocessor bus is used by other bus masters in between transfers by the DMA 36.

Processor modules coupled to the multiprocessor bus slots 80 access the devices on the external bus 78 via the MSI 32, the system interconnect bus 74, and the SEC 24. For example, a processor module coupled to one of the multiprocessor bus slots 80 requests control of the multiprocessor bus 76 through a bus request signal over the multiprocessor bus 76 to the MSI 32. The MSI 32 issues a bus grant signal over the multiprocessor bus 76.

Thereafter, as bus master, the processor module transmits addresses targeted for an external bus 78 device and data over the multiprocessor bus 76 to the MSI 32. In response, the MSI 32 gains control of the system interconnect bus 74 and transfers the received addresses and data over the system interconnect bus 74 as system interconnect bus cycles. The SEC 34 is selected over the system interconnect bus 74, and receives the data over the system interconnect bus 74. In turn, the SEC 34 accesses the targeted device over the external bus 78.

Figure 2:
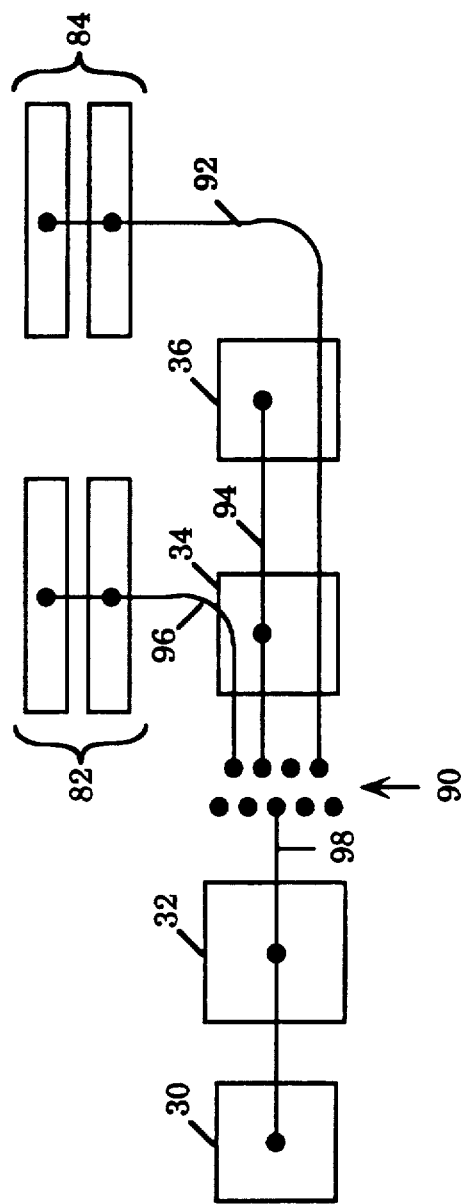
FIG. 2 illustrates the topology of the system interconnect bus on the motherboard, and shows positions on the motherboard for the system interconnect bus slots the motherboard devices coupled to the system interconnect bus.

FIG. 2 illustrates the topology of the system interconnect bus 74 on the motherboard 50. Positions on the motherboard 50 for the system interconnect bus slots 82 and 84 are shown, along with positions for DBRI 30, the MSI 32, the SEC 34, and the DMA 36. The system interconnect bus 74 is distributed on the motherboard 50 using a VIA junction 90. The system interconnect topology is comprised of 4 stubs 92, 94, 96, and 98. Stub 92 couples the VIA junction 90 to the system interconnect bus slots 84. Stub 94 couples the VIA junction 90 to the SEC 34 and the DMA 26. Stub 96 couples the VIA junction 90 to the system interconnect bus slots 82, and stub 98 couples the VIA junction 90 to the DBRI 30 and the MSI 32.

Figure 3:
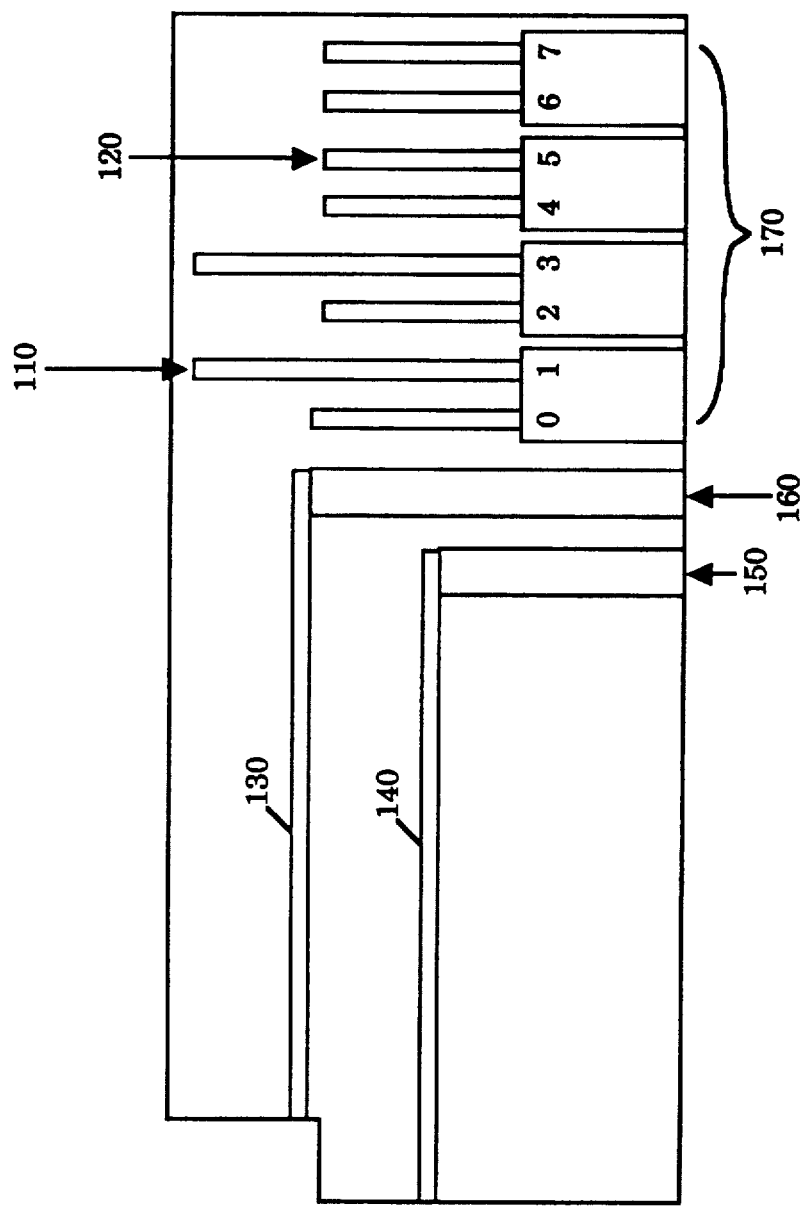
FIG. 3 is a cross sectional view of the motherboard, which shows the arrangement of modules coupled to the multiprocessor bus slots and the system interconnect bus slots, and shows the arrangement of SIMMs comprising the memory subsystem.

FIG. 3 is a cross sectional view of the motherboard 50, which shows the arrangement of modules coupled to the multiprocessor bus slots 80 and the system interconnect bus slots 82 and 84, along with the arrangement of SIMMs comprising the memory subsystem 20. Modules are coupled to the motherboard 50 through single and dual height bus connectors 150 and 160. For example, the bus connector 150 and 160 correspond to the multiprocessor bus slots 80, or the system interconnect bus slots 82, or the system interconnect bus slots 84. A set of SIMM connectors 170 are shown for coupling DSIMMs, VSIMMs, and SSIMMs, as discussed above. In this example, a VSIMM 110 and a DSIMM 120 are indicated, and are shown coupled to the SIMM connectors 170.

In the foregoing specification, the invention has been described with reference to specific exemplary embodiments thereof. It will, however, be evident that various modifications and changes may be made thereto without departing from the broader spirit and scope of the invention as set forth in the independent claims. The specification and drawings are accordingly to be regarded as an illustrative, rather than in a restrictive sense.

What is claimed is:

1. A multiple bus architecture for a computer system, comprising:

memory bus for communicating with a memory subsystem, the memory bus having a first bandwidth defined by a first bit width and a first data frequency, the memory subsystem having a main memory, and a video memory;

multiprocessor bus for communicating with at least one processor module the multiprocessor bus having a second bandwidth substantially equal to the first bandwidth, the second bandwidth defined by a second bit width and a second data frequency, such that the first bit width equals twice the second bit width and the second data frequency equals twice the first data frequency;

memory controller means coupled to communicate over the memory bus and the multiprocessor bus, the memory controller means receiving access requests from the processor modules over the multiprocessor bus and accessing the memory subsystem in accordance with the access requests;

system interconnect bus for communicating with at least one system interconnect module, and at least one input/output device;

first bus interface means coupled to communicate over the multiprocessor bus and the system interconnect bus, the first bus interface means translating access requests between the multiprocessor bus and the system interconnect bus, such that the system interconnect modules communicate with the memory subsystem over the system interconnect bus and the multiprocessor bus and the memory bus.

2. The multiple bus architecture of claim 1, further comprising:
an external bus for communication with a plurality of peripheral devices;
second bus interface means coupled to communicated over the system interconnect bus and the external bus, such that the second bus interface means receives an access request over the system interconnect bus, and accesses the peripheral devices in accordance with the access request over the system interconnect bus.

3. The multiple bus architecture of claim 1, wherein the main memory subsystem comprises a plurality of SIMM memory modules coupled for communication over the memory bus.

4. The multiple bus architecture of claim 1, wherein the main memory comprises at least one DRAM module coupled for communication over the memory bus.

5. The multiple bus architecture of claim 4, wherein the main memory further comprises at least one SRAM module coupled for communication over the memory bus.

6. The multiple bus architecture of claim 1, wherein the video memory comprises at least one VRAM module coupled for communication over the memory bus.

7. The multiple bus architecture of claim 6, further comprising video connector means coupled for communication over a video bus of the VRAM modules, the video connector means for transmitting video signals to a display device.

8. A method for communication in a computer system having a multiple bus architecture, comprising the steps of:
receiving a first access request from a processor module over a multiprocessor bus according to a first bandwidth defined by a first data frequency and a first bit width, the first access request targeted for a memory subsystem comprising a main memory and a video memory;
translating the first access request into a corresponding first access of the memory subsystem over the memory bus according to a second bandwidth substantially equal to the first bandwidth, the second bandwidth defined by a second data frequency and a second bit width, such that the second bit width equals twice the first bit width and the first data frequency equals twice the second data frequency;
receiving a second access request over a system interconnect bus, the second access request targeted for the memory subsystem;
translating the second access request into a third access request over the multiprocessor bus targeted for the memory subsystem;
translating the third access request into a corresponding second access of the memory subsystem over the memory bus.

9. The method of claim 8, further comprising the steps of:
receiving a fourth access request over the multiprocessor bus, the fourth access request targeted for a device coupled to an external bus;
translating the fourth access request into a fifth access request over the system interconnect bus targeted for the device;
translating the fifth access request into a corresponding access of the device over the external bus.

10. The method of claim 8, wherein the memory subsystem comprises a plurality of SIMM memory modules coupled to the memory bus.

11. The method of claim 8, wherein the memory subsystem comprises at least one DRAM module coupled to the memory bus.

12. The method of claim 11, wherein the memory subsystem further comprises at least one SRAM module coupled to the memory bus.

13. The method of claim 11, wherein the memory subsystem further comprises at least one VRAM module coupled to the memory bus.

* * * * *

UNITED STATES PATENT AND TRADEMARK OFFICE
CERTIFICATE OF CORRECTION

PATENT NO. : 5,263,139
DATED : November 16, 1993
INVENTOR(S) : Testa, et. al.

It is certified that error appears in the above-indentified patent and that said Letters Patent is hereby corrected as shown below:

On the Title page, item

[75] Inventors: delete "James Testa, Mountain View; Andreas Behtolsheim, Stanford; both of Calif." and insert --James Testa, Mountain View; Andreas Bechtolsheim, Stanford; Edward Frank, Portola Valley; all of Calif."--

Signed and Sealed this

Seventh Day of June, 1994

Attest:

BRUCE LEHMAN

Attesting Officer

Commissioner of Patents and Trademarks